United States Patent [19]

Hongu et al.

[11] 3,851,190

[45] Nov. 26, 1974

[54] LEVEL SHIFTING CIRCUIT

[75] Inventors: Masayuki Hongu, Tokyo; Yoshio Hishiki, Yokohama, both of Japan

[73] Assignee: Sony Corporation, Tokyo, Japan

[22] Filed: Nov. 9, 1973

[21] Appl. No.: 414,421

[30] Foreign Application Priority Data

Nov. 13, 1972 Japan.............................. 47-130613

[52] U.S. Cl............. 307/310, 307/254, 307/DIG. 1, 330/19, 330/23

[51] Int. Cl........................... H03k 17/14, H03f 3/42

[58] Field of Search...... 307/254, 310, DIG. 1, 270; 330/19, 23

[56] References Cited

UNITED STATES PATENTS

| | | | |
|---|---|---|---|
| 2,929,997 | 3/1970 | Cluwen | 330/23 X |
| 3,629,717 | 12/1971 | Bisgaard | 330/23 |
| 3,668,429 | 6/1972 | Ainsworth | 307/310 X |
| 3,679,917 | 7/1972 | Bryant et al. | 307/310 X |
| 3,806,736 | 4/1974 | Wilhelm | 307/310 X |

OTHER PUBLICATIONS

"MECL Integrated Circuits–MC304G–Bias Driver;" Motorola Semiconductor Products Inc.; 2 pages; 8/1963.

*Primary Examiner*—Rudolph V. Rolinec
*Assistant Examiner*—L. N. Anagnos
*Attorney, Agent, or Firm*—Lewis H. Eslinger; Alvin Sinderbrand

[57] ABSTRACT

A level shifting circuit includes first, second and third transistors of one conductivity type each having base, emitter and collector electrodes. The collector and emitter electrodes of the first and second transistors are connected in series between a pair of voltage terminals and the collector electrode of the second transistor is further connected to the base electrode of the third transistor. A first resistor is included in the series circuit between the emitter electrode of the first transistor and the collector electrode of the second transistor, and a second resistor is included in the emitter circuit of the second transistor. A biasing circuit is provided to bias the base electrode of the second transistor. If an input signal reference to a first DC voltage level is applied to the base electrode of the first transistor, an output signal referenced to a second DC voltage level is derived from one of the emitter and collector electrodes of the third transistor. The ratio between the resistance values of the first and second resistors is selected so that the difference between the first and second DC voltage levels to which the input and output signals are referenced is maintained constant regardless of the temperature. The magnitude of the difference between the first and second DC voltage levels is adjusted by the biasing voltage applied to the base electrode of the second transistor.

8 Claims, 5 Drawing Figures

LEVEL SHIFTING CIRCUIT

BACKGROUND OF THE INVENTION

This invention relates generally to a level shifting circuit operative to shift a DC level of a signal and, more particularly, to a level shifting circuit in which the magnitude of the shifted DC level is maintained constant over a wide range of temperature variation. The circuit configuration of this invention is simple and especially suitable for being formed as an integrated circuit in a single semiconductor wafer.

Different types of level shifting circuits are widely used in many electric circuits and especially in integrated circuits where numerous DC coupled transistor amplifiers of the same conductivity type are connected in cascade. In such integrated circuits, level shifting circuits are usually necessary because the DC operating voltage levels of the amplifiers will be gradually shifted higher or lower in accordance with the conductivity type of the transistors connected in cascade therein. As the DC operating voltage levels are shifted the dynamic ranges of the amplifiers successively become narrower. Hence, level shifting circuits are used to restore the original DC operating voltage level at a certain amplifier stage or stages in order to maintain the dynamic ranges of succeeding amplifier stages sufficiently wide.

A typical level shifting circuit is formed of a plurality of cascade connected emitter-follower transistors. This circuit configuration is often used because of several advantages offered such as, for example, a high input impedance a low output impedance, simplicity of circuit design, and the like. However in the level shifting circuit utilizing cascade connected emitter-follower transistors, the amount of DC level shift is determined by the number of transistors connected in cascade and is not easily made sufficiently large. That is, the DC level shift obtained by each cascade connected transistor is equal to the DC voltage difference between the base and emitter electrodes thereof, which is approximately 0.7 volts in a silicon transistor. Consequently a large number of transistors is often required to be connected in cascade to obtain a desirably large amount of DC voltage shift. For example, about ten transistors should be cascaded to derive a DC voltage shift of 7 volts.

Moreover, in such cascade connected emitter-follower level shifting circuits, the DC voltage shift is affected by temperature variations in accordance with the temperature characteristic of the PN junctions established between the base and emitter electrodes of the emitter-follower transistors. More particularly, if $n$ emitter-follower transistors are connected in cascade in order to obtain a total DC level shift $nV_{BE}$ volts, where $V_{BE}$ is the DC voltage difference between the base and emitter electrodes of each emitter-follower transistor, the total DC level shift of $nV_{BE}$ is significantly affected by the cumulative temperature characteristics of the PN junctions of the $n$ transistors. Consequently, the DC level shift $nV_{BE}$ cannot be readily stabilized or maintained constant with respect to temperature variations. Therefore, in prior art techniques, it is attempted to compensate for variations in the DC level shift caused by temperature variations by changing or shifting the input DC voltage in response to the temperature variation. That is, the input DC voltage is changed or shifted in the same direction and by the same amount as the change or shift in the temperature characteristics of the total number of PN junctions of the emitter-follower transistors.

It is, however, generally desired for most circuits to maintain the input DC voltage constant with respect to temperature variations, especially when the circuits are formed of a plurality of DC coupled amplifier stages.

SUMMARY OF THE INVENTION

Accordingly it is an object of this invention to provide an improved level shifting circuit wherein the attendant disadvantages of the prior art are avoided.

It is another object of this invention to provide an improved level shifting circuit in which the magnitude of the DC level shift is maintained substantially constant over a wide range of temperature variations.

It is a further object of this invention to provide a specific level shifting circuit in which the magnitude of the DC level shift is easily and flexibly determined.

It is still a further object of this invention to provide a specific level shifting circuit which is simple in construction and suitable for being formed as an integrated circuit in a single semiconductor wafer.

Various other objects and advantages will become clear from the forthcoming detailed description and the novel features will be particularly pointed out in the appended claims.

The present invention provides a novel DC level shifting circuit which operates stably over a wide range of temperature variations and wherein the amount of the DC level shift is flexibly determined. The level shifting circuit according to this invention includes first, second and third transistors of one conductivity type each having base, emitter and collector electrodes; the collector electrode of the first transistor being connected to a voltage terminal and the emitter electrode thereof being connected to the collector electrode of the second transistor and to the base electrode of the third transistor through a first resistor; a base biasing circuit is provided to bias the base electrode of the second transistor at a proper voltage; and the emitter electrode of the second transistor is connected to a reference voltage terminal by a second resistor. If an input signal referenced to a first DC voltage level is applied to the base electrode of the first transistor, an output signal, the DC voltage level of which is shifted to a second DC voltage level, is derived from one of the emitter and collector electrodes of the third transistor.

The magnitude of the DC voltage level shift, that is, the voltage difference between the first and second DC voltage levels, is maintained constant regardless of the temperature by selecting the ratio of the resistance values of the first and second resistors. The amount of the DC voltage level shift can be adjusted in accordance with the biasing voltage applied to the base electrode of the second transistor.

DETAILED DESCRIPTION OF THE PREFERRED EMBODIMENTS

Figure 1:
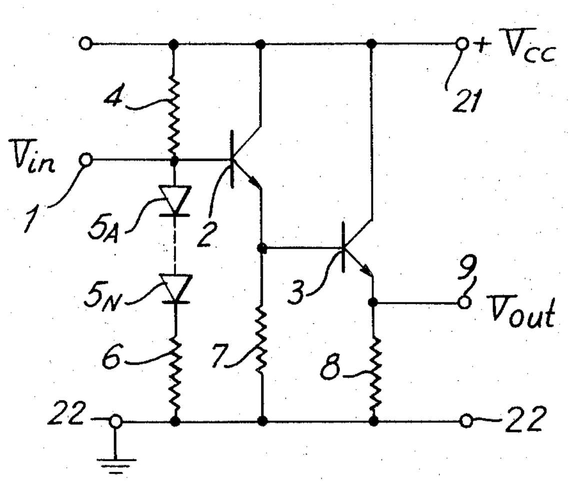
FIG. 1 is a schematic diagram of a level shifting circuit of the prior art.

Referring now to FIG. 1, there is shown a typical prior art level shifting circuit comprised of transistors 2 and 3, resistors 4 and 6 and diodes $5_A - 5_N$. A signal input terminal 1 is connected to the base electrode of the transistor 2. The collector electrode of the transistor 2 is connected to a voltage supply terminal 21 adapted to be coupled to a suitable source of energizing potential $+V_{cc}$. The emitter electrode of the transistor 2 is connected to a reference voltage terminal 22, such as ground, by means of a resistor 7. The resistor 4, a predetermined number $n$ of diodes $5_A - 5_N$ and a resistor 6 form a voltage dividing circuit connected in series between the voltage supply terminal 21 and the reference voltage terminal 22, and a junction point between the resistor 4 and the diode $5_A$ is connected to the base electrode of the transistor 2 for biasing the transistor at a temperature compensated DC voltage. The emitter electrode of the transistor 2 is also connected to the base electrode of the transistor 3 and the collector electrode of the latter transistor is connected to the voltage supply terminal 21. The emitter electrode of the transistor 3 is connected to an output terminal 9 and is also connected to the reference voltage terminal 22 through a resistor 8.

In the operation of the circuit of FIG. 1, an input signal applied to the signal input terminal 1 is referenced to a first DC voltage level $V_{in}$ which is determined by a function of the supply voltage $V_{cc}$, the resistance values of the resistors 4 and 6, and the number $n$ of diodes $5_A - 5_N$. If the output derived from the output terminal 9 is referenced to a second DC voltage $V_{out}$, the following mathematical expressions may be considered:

$$V_{in} = (V_{cc} - nV_d)/(R_4 + R_6)\ R_6 + nV_d = [(R_6)/(R_4 + R_6)\ V_{cc}] + [(nR_4)/(R_4 + R_6)\ V_d] \quad 1.$$

$$V_{out} = V_{in} - V_{BE2} - V_{BE3} \quad 2.$$

where $V_d$ is the DC voltage across each diode in the number $n$ of series connected diodes $5_A - 5_N$, $V_{BE2}$ is the DC voltage difference between the base and emitter electrodes of the transistor 2, $V_{BE3}$ is the DC voltage difference between the base and emitter electrodes of the transistor 3, and $R_4$ and $R_6$ are respectively the resistance values of the resistors 4 and 6.

In the equations (1) and (2) above, $V_d$, $V_{BE2}$ and $V_{BE3}$ are approximately equal to one another, so that the following expressions are applicable:

$$V_{in} = [(R_6)/(R_4 + R_6)\ V_{cc}] + [(nR_4)/(R_4 + R_6) V_{BE}] \quad 3.$$

$$V_{out} = V_{in} - 2V_{BE} = [(R_6)/(R_4 + R_6)\ V_{cc}] + [(nR_4)/(R_4 + R_6) - 2]\ V_{BE} \quad 4.$$

where $V_{BE} = V_d = V_{BE2} = V_{BE3}$

The voltage $V_{BE}$ is subjected to a degree of temperature dependency. From equation (4), it can be seen that the output DC voltage $V_{out}$ is maintained constant regardless of temperature when the following equation is satisfied:

$$[(nR_4)/(R_4 + R_6)] - 2 = 0 \quad 5.$$

The equation (5) can be rewritten as follows:

$$n = 2\ [1 + (R_6/R_4)] \quad 6.$$

By substituting equation (6) into equations (3) and (4), respectively, the following equations are obtained:

$$V_{in} = [(R_6)/(R_4 + R_6)\ V_{cc}] + 2V_{BE} \quad 7.$$

$$V_{out} = [(R_6)/(R_4 + R_6)]\ V_{cc} \quad 8.$$

By comparing equations (7) and (8), it can be seen that in the circuit of FIG. 1 a DC voltage shift 2 $V_{BE}$ is obtained and the output DC voltage $V_{out}$ can be maintained constant regardless of temperature variations; however, the input DC voltage $V_{in}$ is affected by the temperature characteristics of the two PN junctions.

Figure 2:
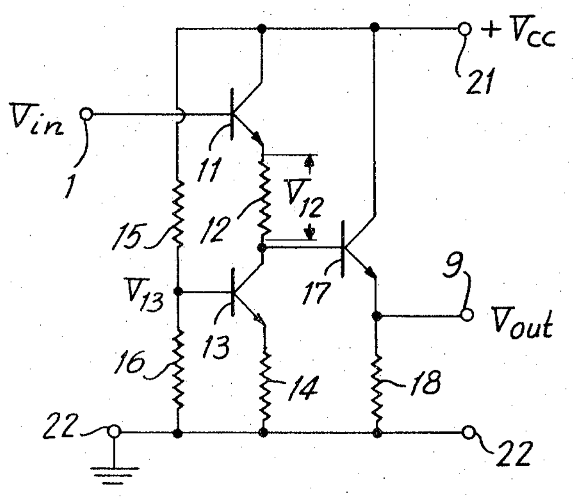
PRIOR ART FIG. 2
FIGS. 2 – 5 are schematic diagrams of exemplary embodiments of level shifting circuits according to the present invention

Referring now to FIG. 2 which illustrates one embodiment of the present invention and wherein circuit components identical to those shown in FIG. 1 are identified by corresponding reference numerals, a level shifting circuit is schematically represented comprising transistors 11, 13 and 17 and resistors 12, 14, 15, 16 and 18. A signal input terminal 1 is connected to the base electrode of the input transistor 11. The collector electrode of the transistor 11 is connected to a voltage supply terminal 21 adapted to be supplied with a suitable source of energizing potential $+V_{cc}$ and the emitter electrode of the transistor is connected to the collector electrode of the transistor 13 through the resistor 12. The emitter electrode of the transistor 13 is connected to a reference voltage terminal 22 through the resistor 14 and the base electrode of the latter transistor is connected to a junction point between a pair of voltage dividing resistors 15 and 16 which are connected across the voltage supply terminal 21 and the reference voltage terminal 22. The collector electrode of the transistor 13 is also connected to the base electrode of the output transistor 17. The collector electrode of the transistor 17 is connected to the voltage terminal 21 and the emitter electrode thereof is connected to the reference voltage terminal 22 through the resistor 18. An output terminal 9 is connected to the emitter electrode of the transistor 17.

In the operation of the circuit of FIG. 2, an input signal referenced to a first DC voltage level $V_{in}$ is applied to the input terminal 1 and passes through the pair of emitter-follower transistor amplifiers 11 and 17 to the output terminal 9 whereat an output signal referenced to a second DC voltage $V_{out}$ is derived. The DC level of the resultant output signal is shifted or changed relative to that of the input signal by the amount $V_{out} - V_{in}$. The DC voltage level shift obtained from the circuit of FIGS. 2 may be analyzed by the following equations:

$$V_{out} = V_{in} - V_{BE11} - V_{12} - V_{BE17} \quad 9.$$

$$V_{12} = [(V_{13} - V_{BE13})/(R_{14})]\ R_{12} \quad 10.$$

where $V_{BE11}$ is the DC voltage difference between the base and emitter electrodes of the transistor 11, $V_{BE13}$ is the DC voltage difference between the base and emitter electrodes of the transistor 13, $V_{BE17}$ is the DC voltage difference between the base and emitter electrodes of the transistor 17, $V_{12}$ is the DC voltage across the resistor 12, $V_{13}$ is the DC voltage at the base electrode of the transistor 13, and $R_{12}$ and $R_{14}$ are the resistance values of the resistors 12 and 14 respectively.

In equations (9) and (10) above, $V_{BE11}$, $V_{BE13}$ and $V_{BE17}$ are approximately equal to one another, so that the following equation can be derived by substituting equation (10) into equation (9):

$$V_{out} = V_{in} - V_{BE11} - [(V_{13} - V_{BE13})/(R_{14})]\ R_{12} - V_{BE17} = V_{in} - (R_{12}/R_{14})\ V_{13} + [(R_{12})/(R_{14}) - 2]\ V_{BE} \quad 11.$$

where $V_{BE} = V_{BE11} = V_{BE13} = V_{BE17}$.

In the circuit of FIG. 2, the resistance value $R_{12}$ is selected to be twice as great as the resistance value $R_{14}$ so that the following equation is derived by substituting $R_{12} = 2R_{14}$ into equation (11):

$$V_{out} = V_{in} - 2V_{13} \quad 12.$$

From equation (12) it can be seen that the DC voltage level of the output signal is shifted or decreased from that of the input signal by the amount $2V_{13}$, and the shifted DC voltage level is a function only of the DC voltage applied to the base electrode of the transistor 13 and is not a function of the base-emitter voltage $V_{BE}$ of the transistors 11, 13 or 17, which base-emitter voltage is subjected to a degree of temperature dependency. Therefore, it is to be understood that if only the base voltage $V_{13}$ of the transistor 13 is maintained constant regardless of the temperature, the shifted DC voltage level $2V_{13}$ is also maintained constant regardless of the temperature. Now in the circuit of FIG. 2, the voltage $V_{13}$ applied to the base of the transistor 13 is derived from the voltage divider network comprised of resistors $R_{15}$ and $R_{16}$ and may be expressed as:

$$V_{13} = [(R_{16})/(R_{15} + R_{16})]\ V_{cc} \qquad 13.$$

where $R_{15}$ and $R_{16}$ are the resistance values of the resistors 15 and 16 respectively.

As may be observed from equation (13), the base voltage $V_{13}$ of the transistor 13 will be maintained constant regardless of the temperature when the temperature characteristics of the resistors 15 and 16 are selected to be equal and the supply voltage $V_{cc}$ is maintained at a constant value regardless of the temperature. Such selection of the equal temperature characteristics of the resistors 15 and 16 and the maintenance of the supply voltage $V_{cc}$ at a constant value regardless of the temperature are well within the field of current technology and are well known to those of ordinary skill in the art. Thus, it is seen, the circuit according to the present invention is simple and inexpensive in construction and well-suited for being formed in a single semiconductor wafer as an integrated circuit.

Figure 3:
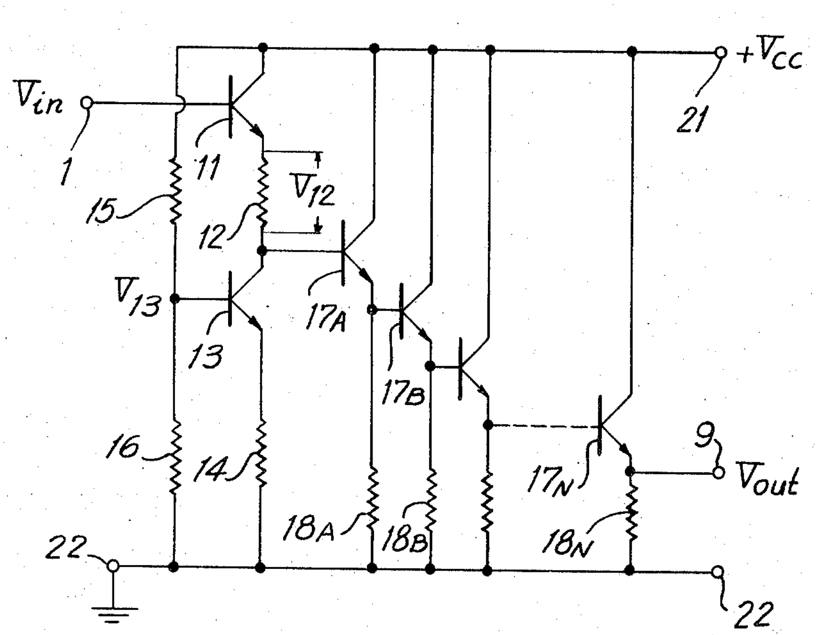

FIG. 3 shows a modified embodiment of the present invention wherein a number $n$ directly coupled emitter-follower transistors 17A – 17N having corresponding emitter resistors 18A – 18N are used in place of a single emitter-follower transistor 17 as in FIG. 2. The same reference numerals have been applied to the corresponding elements of the circuits of FIGS. 2 and 3. In the illustrated circuit, equation (11) is modified in the obvious manner to obtain:

$$V_{out} = V_{in} - [(R_{12}/R_{14})\ V_{13} + (n+1 - R_{12}/R_{14})V_{BE}] \qquad 14.$$

The resistance values $R_{12}$ and $R_{14}$ of the resistors 12 and 14 respectively are selected as $R_{12}/R_{14} = n+1$ to derive the following equation:

$$V_{out} = V_{in} - (n+1)\ V_{13} \qquad 15.$$

From equation (15) it can be seen that the DC voltage level $V_{in}$ to which the input signal is referenced is shifted by the circuit of FIG. 3 by the amount $(n+1)$ $V_{13}$. The amount of DC voltage level shift is maintained constant regardless of the temperature when the base voltage $V_{13}$ is maintained constant regardless of the temperature. The base voltage $V_{13}$ of the transistor 13 can be easily maintained constant regardless of the temperature in a manner similar to that referred to with respect to FIG. 2.

Figure 4:
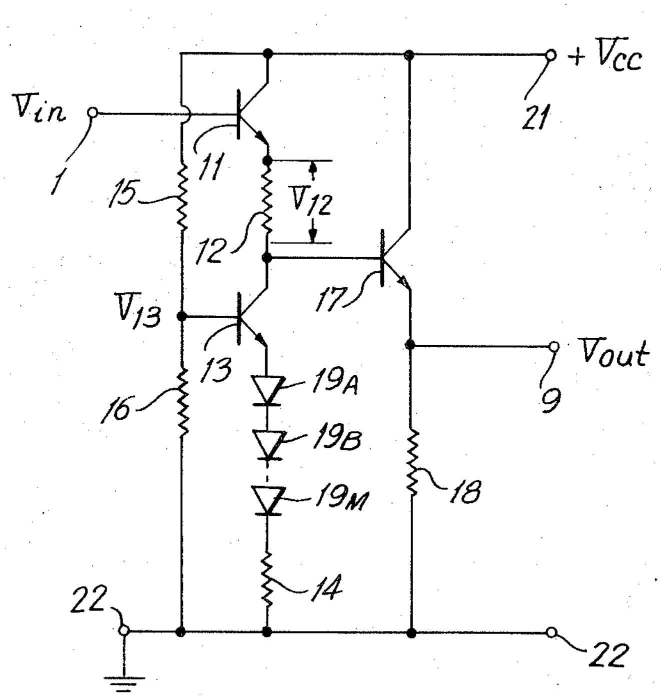

FIG. 4 is another modified embodiment of the present invention wherein a number $m$ of series connected PN junction diodes 19A–19M are connected in series between the emitter electrode of the transistor 13 and the resistor 14 of the circuit schematically represented in FIG. 2. The same reference numerals have been applied to the corresponding elements of the circuits of FIGS. 2 and 4.

If, in the circuit illustrated in FIG. 4, the voltage drop across each PN junction of the diodes 19A–19M and the transistors is approximately equal to $V_{BE}$, the following equation may be derived from an obvious modification of equation (11):

$$V_{out} = V_{in} - (R_{12}/R_{14})\ V_{13} + [(R_{12}/R_{14})\ (m+1) - 2]V_{BE} \qquad 16.$$

The resistance values $R_{12}$ and $R_{14}$ of the resistors 12 and 14 respectively are selected in this embodiment as $R_{12}/R_{14} = 2/(m+1)$, to derive the following equation:

$$V_{out} = V_{in} - (2V_{13}/m+1) \qquad 17.$$

It can be seen from the equation (17) that the DC voltage level $V_{in}$ to which the input signal is referenced is shifted by the circuit of FIG. 4 by the amount $2V_{13}$ / $(m+1)$. The amount of DC voltage level shift is maintained constant regardless of the temperature when the base voltage $V_{13}$ of the transistor 13 is maintained constant regardless of the temperature. The base voltage $V_{13}$ of the transistor 13 can be easily maintained constant regardless of the temperature in a manner similar to that referred to with respect to FIG. 2.

Figure 5:
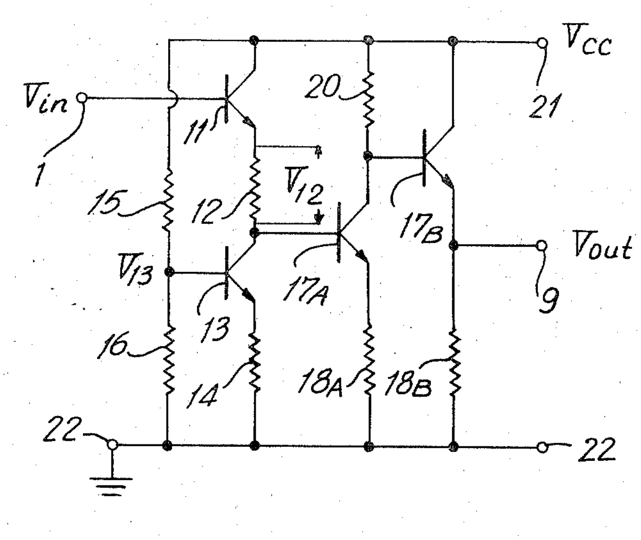

FIG. 5 shows a further modified embodiment of the present invention wherein a collector follower transistor 17A and an emitter follower transistor 17B are connected in cascade in place of the single transistor 17 of FIG. 2. The same reference numerals have been applied to the corresponding elements of the circuits in FIGS. 2 and 5.

Emitter resistors 18A and 18B are connected to the emitter electrodes of the transistors 17A and 17B, respectively, a collector resistor 20 is connected to the collector electrode of the transistor 17A. By referring to equation (11), the circuit of FIG. 5 may be mathematically analyzed to derive the following equation:

$$V_{out} = V_{cc} - (V_{in} - V_{BE11} - V_{12} - V_{BE17A})[(R_{20}/R_{18A}) - V_{BE17B}] \qquad 18.$$

where $V_{BE17A}$ is the DC voltage difference between the base and emitter electrodes of the transistor 17A, $V_{BE17B}$ is the DC voltage difference between the base and emitter electrodes of the transistor 17B, and $R_{18A}$ and $R_{20}$ are the resistance values of the resistors 18A and 20 respectively. By substituting the valid approximation $V_{BE11} = V_{BE13} = V_{BE17A} = V_{BE17B} = V_{BE}$ and by rearranging terms, the following equation is derived:

$$V_{out} = V_{cc} - [(V_{in} - (R_{12}/R_{14})\ V_{13})\ (R_{20}/R_{18A})] + [(2 - R_{12})/R_{14}\ (R_{20}/R_{18A}) - 1]\ V_{BE} \qquad 19.$$

The resistance values $R_{12}$, $R_{14}$, $R_{18A}$ and $R_{20}$ are selected to satisfy the equation:

$$(2 - R_{12})/R_{14}(R_{20}/R_{18A}) - 1 = 0 \qquad 20.$$

Equation (20) may be rewritten as:

$$R_{12}/R_{14} = 2 - (R_{18A}/R_{20}) \qquad 21.$$

Substituting $(R_{12}/R_{14}) + (R_{18A}/R_{20}) = 2$ of equation (21) into equation (19) results in the following equation:

$$V_{out} = V_{cc} - [\ V_{in} - (2 - R_{18A}/R_{20})\ V_{13}]\ (R_{20}/R_{18A}) \qquad 22.$$

It can be seen from equations (21) and (22) that the circuit of FIG. 5 operates as a temperature stabilized level shifting circuit when the ratio between the resistance values $R_{12}$ and $R_{14}$ of the resistors 12 and 14, respectively, is selected as shown.

In the illustrated embodiment the amount by which the DC voltage level, to which the input signal is referenced, is shifted is determined by a function of $V_{cc}$, $V_{in}$, $V_{13}$, $R_{18A}$ and $R_{20}$ as can be seen from equation (22). Thus, it may be appreciated that the level shifting circuit schematically depicted in FIG. 5 is stabilized regardless of the temperature by properly selecting the ratio of the resistance values of the resistors 12 and 14. Consequently, the magnitude of the DC level shift is likewise maintained constant regardless of the temperature.

While the invention has been particularly shown and described with reference to specific embodiments thereof, it will be obvious to those skilled in the art that the foregoing and various other changes and modifications in form and details may be made without departing from the spirit and scope of the invention. It is therefore intended that the appended claims be interpreted as including all such changes and modifications.

What is claimed is:

1. A level shifting circuit, comprising:
first and second transistors of one conductivity type, each transistor having base, emitter and collector electrodes;
input means for supplying an input signal referenced to a first DC voltage level to the base electrode of said first transistor;
first and second voltage terminals for providing a reference potential thereacross;
means for connecting the collector electrode of said first transistor to one of said voltage terminals;
means including a first resistor for connecting the emitter electrode of said first transistor to the collector electrode of said second transistor;
means including a second resistor for connecting the emitter electrode of said second transistor to the other of said voltage terminals;
bias means for supplying a bias voltage to the base electrode of said second transistor;
output means including a third transistor of said one conductivity type having base, emitter and collector electrodes;
means for connecting the collector electrode of said second transistor to the base electrode of said third transistor;
means for connecting the emitter and collector electrodes of said third transistor between said first and second voltage terminals; and
an output terminal connected to one of the emitter and collector electrodes of said third transistor for deriving an output signal thereat referenced to a second DC voltage level;
the resistance values of said first and second resistors admitting of a ratio such that the difference between said first and second DC voltage levels is maintained substantially constant notwithstanding variations in temperature.

2. A level shifting circuit according to claim 1 wherein said means for connecting the emitter and collector electrodes of said third transistor between said first and second voltage terminals comprises:
means for connecting the collector electrode of said third transistor to said one voltage terminal; and
means including a third resistor for connecting the emitter electrode of said third transistor to said other voltage terminal; and
said output terminal is connected to the emitter electrode of said third transistor.

3. A level shifting circuit according to claim 2 wherein said means for connecting the collector electrode of said second transistor to the base electrode of said third transistor comprises a plurality of series connected PN junction means.

4. A level shifting circuit according to claim 3 wherein said plurality of series connected PN junction means comprises $n$ emitter-follower transistor means and wherein the ratio between the resistance values of said first and second resistors is equal to $n+1$.

5. A level shifting circuit according to claim 2 wherein said means including a second resistor for connecting the emitter electrode of said second transistor to said other voltage terminal further includes a plurality of series connected PN junction means.

6. A level shifting circuit according to claim 5 wherein said plurality of series connected PN junction means comprises $m$ diode means and wherein the ratio between the resistance values of said first and second resistors is equal to $2/(m+1)$.

7. A level shifting circuit according to claim 2 wherein said means for connecting the collector electrode of said second transistor to the base electrode of said third transistor comprises:
a fourth transistor of said one conductivity type having base, emitter and collector electrodes;
means for connecting the collector electrode of said second transistor to the base electrode of said fourth transistor;
means including a fourth resistor for connecting the collector electrode of said fourth transistor to said one voltage terminal;
means including a fifth resistor for connecting the emitter electrode of said fourth transistor to said other voltage terminal; and
means for connecting the collector electrode of said fourth transistor to the base electrode of said third transistor.

8. A level shifting circuit according to claim 7 wherein the sum of the ratio between the resistance values of said first and second resistors and the ratio between the resistance values of said fourth and fifth resistors is equal to an integer.

* * * * *